(12) United States Patent
Czech et al.

(10) Patent No.: US 6,928,506 B2
(45) Date of Patent: Aug. 9, 2005

(54) APPARATUS USING BUS CAPACITANCE TO PERFORM DATA STORAGE DURING DATA TRANSFER ACROSS THE BUS

(75) Inventors: Martin Czech, Freiburg (DE); Michael Albert, Ettenheim (DE)

(73) Assignee: Micronas GmbH, Freiburg (DE)

( * ) Notice: Subject to any disclaimer, the term of this patent is extended or adjusted under 35 U.S.C. 154(b) by 479 days.

(21) Appl. No.: 09/747,279

(22) Filed: Dec. 21, 2000

(65) Prior Publication Data

US 2001/0013078 A1 Aug. 9, 2001

(30) Foreign Application Priority Data

Dec. 21, 1999 (DE) .......................................... 199 61 727

(51) Int. Cl.$^7$ .......................... G06F 13/14; G11C 11/24
(52) U.S. Cl. ...................................... 710/305; 365/150
(58) Field of Search ....................... 365/185.01–185.08, 365/149–150; 710/305

(56) References Cited

U.S. PATENT DOCUMENTS

| | | | | |
|---|---|---|---|---|
| 4,500,988 A | * | 2/1985 | Bennett et al. | 326/86 |
| 4,537,471 A | * | 8/1985 | Grinberg et al. | 349/48 |
| 4,551,821 A | | 11/1985 | Yokouchi et al. | 365/203 |
| 4,567,561 A | * | 1/1986 | Wyatt et al. | 712/245 |
| 4,651,036 A | | 3/1987 | Tallaron | 307/571 |
| 4,774,422 A | * | 9/1988 | Donaldson et al. | 326/86 |
| 4,802,132 A | | 1/1989 | Ohsawa | 365/230 |
| 4,829,515 A | * | 5/1989 | Donaldson et al. | 370/402 |
| 4,956,564 A | * | 9/1990 | Holler et al. | 365/185.03 |
| 4,961,002 A | * | 10/1990 | Tam et al. | 365/185.03 |
| 5,023,488 A | | 6/1991 | Gunning | 307/475 |
| 5,028,810 A | * | 7/1991 | Castro et al. | 365/185.03 |
| 5,293,378 A | * | 3/1994 | Shimizu | 370/474 |
| 5,491,428 A | | 2/1996 | Pan | 326/17 |
| 5,808,490 A | | 9/1998 | Watanabe | 327/94 |
| 5,926,431 A | | 7/1999 | Toda | 365/230.03 |
| 5,959,900 A | | 9/1999 | Matsubara | 365/189.05 |
| 6,378,011 B1 | * | 4/2002 | Moore et al. | 710/71 |

FOREIGN PATENT DOCUMENTS

JP 0007058608 3/1995

* cited by examiner

*Primary Examiner*—Sumati Lefkowitz
(74) *Attorney, Agent, or Firm*—O'Shea, Getz & Kosakowski, P.C.

(57) ABSTRACT

The invention relates to a circuit arrangement with two or more circuit sections, which cooperate through a data transfer device. The invention solves the problem of double area expenditure for two memory devices for each receiver, in that the data bus itself takes over the role of one of these memory devices, namely that of the memory device functioning as master. For this it is only necessary to integrate a single memory device on the data bus, which takes over the role of the no longer needed memory device for each data receiver. By saving the memory device associated with each receiver, the semiconductor chip area needed for communication buses can be optimized and the master memory device of the prior art may be replaced by the bus capacitance.

15 Claims, 4 Drawing Sheets

APPARATUS USING BUS CAPACITANCE TO PERFORM DATA STORAGE DURING DATA TRANSFER ACROSS THE BUS

BACKGROUND OF THE INVENTION

The present invention relates to a circuit arrangement with two or more circuit components that cooperate through a data transfer device, and in particular to an integrated circuit arrangement for transferring data between a data transmitter and a data receiver.

Circuit arrangements often have a digital and/or an analog/digital integrated circuit, and are generally referred to as mixed-signal ICs. A circuit arrangement with such a structure is illustrated in FIG. 1. The circuit arrangement includes a first circuit section 1, a second circuit section 2 and a data transfer device 3 between the first and second sections.

Referring still to FIG. 1, the first circuit section 1 designates the above-mentioned integrated circuit, which is embedded in the second circuit section 2, and which is connected to this by communication buses or connection lines. The second circuit section 2 can have output or bond pads. Output terminals, which form the interface of the circuit arrangement and thus of the integrated circuit to the outside world may be bonded on these bond pads. However, it would also be conceivable that the second circuit section 2 is also structured as an integrated circuit in which the integrated circuit of the first circuit section 1 is embedded. Circuit arrangements with such a structure are, for example, representatives of integrated circuits technically known as "cell-based systems" or "systems on silicon" or "circuits with embedded macros." With integrated circuits of this kind, the first circuit section 1 (cell or embedded macro) frequently is an already-existing functional block, which is only embedded in a new environment (the second circuit section).

Both the first and second circuit sections 1, 2 typically need a fixed chip surface due to their functionality or their manufacturing technology, especially in the case of chip bonding, ESD protection, etc. Consequently, the chip surface cannot be further optimized without major interventions in the functionality or technology. However, the chip surface is often largely determined by the data transfer device 3 that is needed between the circuit sections. Particularly in very complex systems (e.g., signal processors, processors, microcontrollers, etc.) this can sometimes be much larger than the integrated circuit itself.

A typical data transfer device 3 is illustrated in FIG. 2. The device includes a data transmitter 10, a data receiver 12, and a data bus 17. The data transmitter 10 sends data via a first data buffer 16 and via the data bus 17 to a plurality N of data receivers 12–15. Each data receiver 12–15 has associated with it a second data buffer 18 and two memory devices 20, 22. The two memory devices 20, 22 associated with the data receiver 12 are arranged in a master-slave structure. During data transfer, this structure allows transfer of the data from the data bus 17 to the data receiver 12. This is made possible by a process controller 24 that opens the first memory device 20 acting as master, and does not close it until this memory device contains updated (i.e., valid) data. At this moment, under the control of the process controller 24, the first memory device 20 is closed, and the second memory device 22, acting as slave, is opened. This ensures that only valid, error-free data are read out on the receiver side.

However, for the data transfer device 3, the surface area needed for two memory devices 20, 22 becomes greater and greater as more receivers are connected to the data bus 17. As a result, and as a result of layout-based contingencies, the region associated with the data transfer device 3 (FIG. 1) often becomes disproportionately large compared to the integrated circuit 1 and the pad region 2. The problem of a double surface expenditure for two memory elements for each receiver consequently is often unacceptable, just for reasons of cost.

Therefore, there is a need for a circuit arrangement whose design optimizes the surface of the data transfer device.

SUMMARY OF THE INVENTION

Briefly, according an aspect of the present invention, a circuit arrangement for transferring data between a data transmitter and a data receiver includes a buffer device that receives a data signal from the data transmitter and provides a buffered data signal onto a data bus. A first memory element receives and stores the buffered signal on the data bus and provides a first stored signal. A second memory element receives and stores the first stored signal and provides a second stored signal to the data receiver. A controller controls the output state of the buffer device, to control the transfer of data between the first and second memory elements.

The invention solves the problem of double surface expenditure for two memory devices for each receiver, in that the data bus itself takes over the role of one of these memory devices (i.e., the memory device which functions as master). A single memory device is integrated onto the data bus and takes over the role of the no longer needed memory device for each data receiver. By saving one of the memory devices associated with each receiver, the integrated circuit surface area associated with the data transfer devices may be optimized, resulting in a reduction of surface area and thus a reduction of cost.

These memory devices may be implemented by capacitances and/or holding elements. In one embodiment, the capacitive element is realized from the capacitance of the data bus lines with respect to one or more reference lines. In this case, the function of the inventive data transfer device is still assured even if no dedicated capacitive component is provided.

The invention is especially suitable for complex integrated circuits, such as for example microprocessors, microcontrollers and signal processors.

These and other objects, features and advantages of the present invention will become apparent in light of the following detailed description of preferred embodiments thereof, as illustrated in the accompanying drawings.

DETAILED DESCRIPTION OF THE INVENTION

Figure 1:
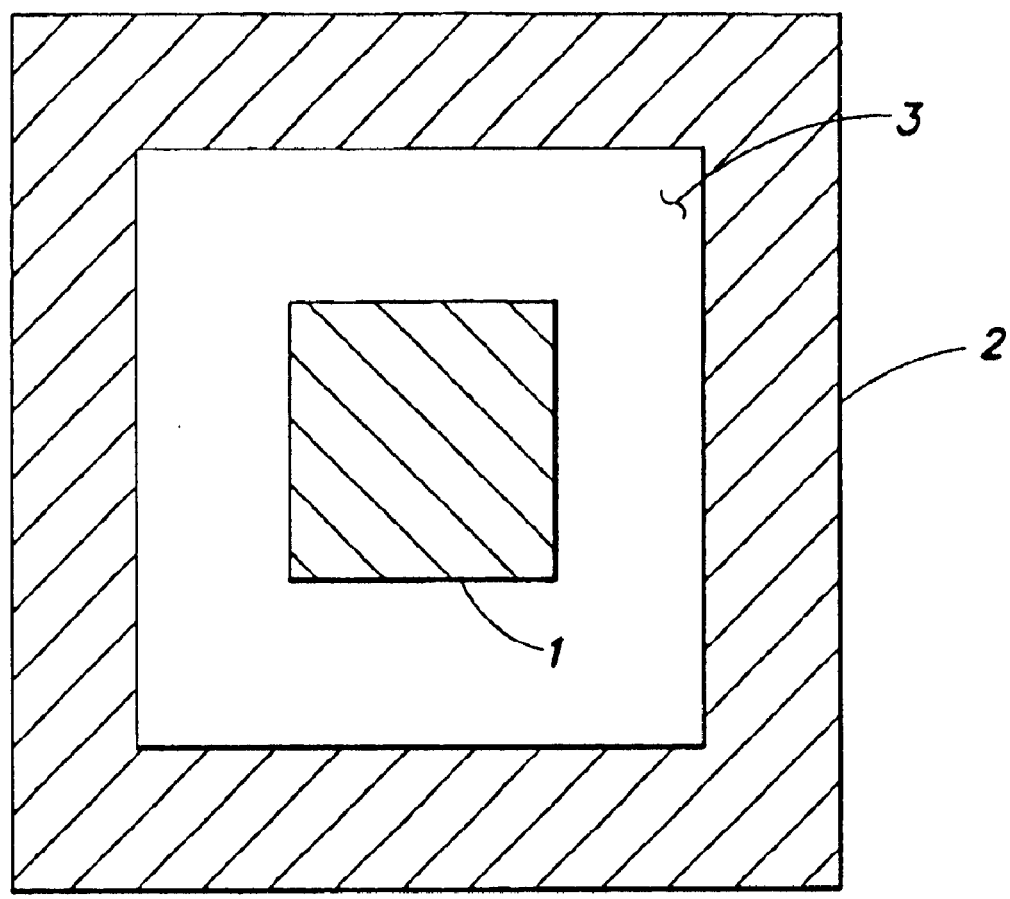
FIG. 1 is a schematic illustration of a generic circuit arrangement.
Figure 2:
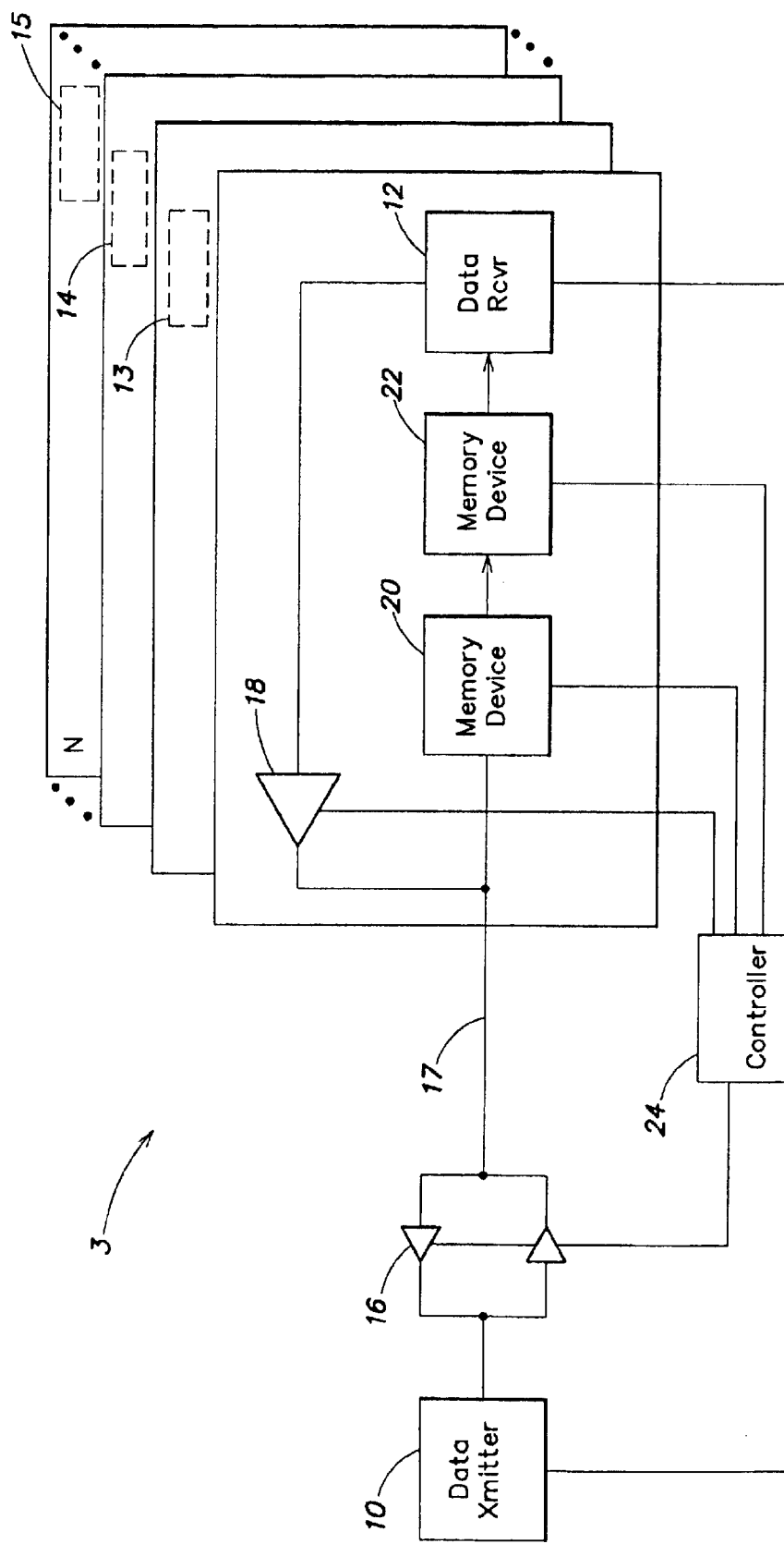
FIG. 2 is a schematic illustration of a prior art transfer device that includes a first circuit section acting as data transmitter and at least one second circuit section acting as data receiver.
Figure 3:
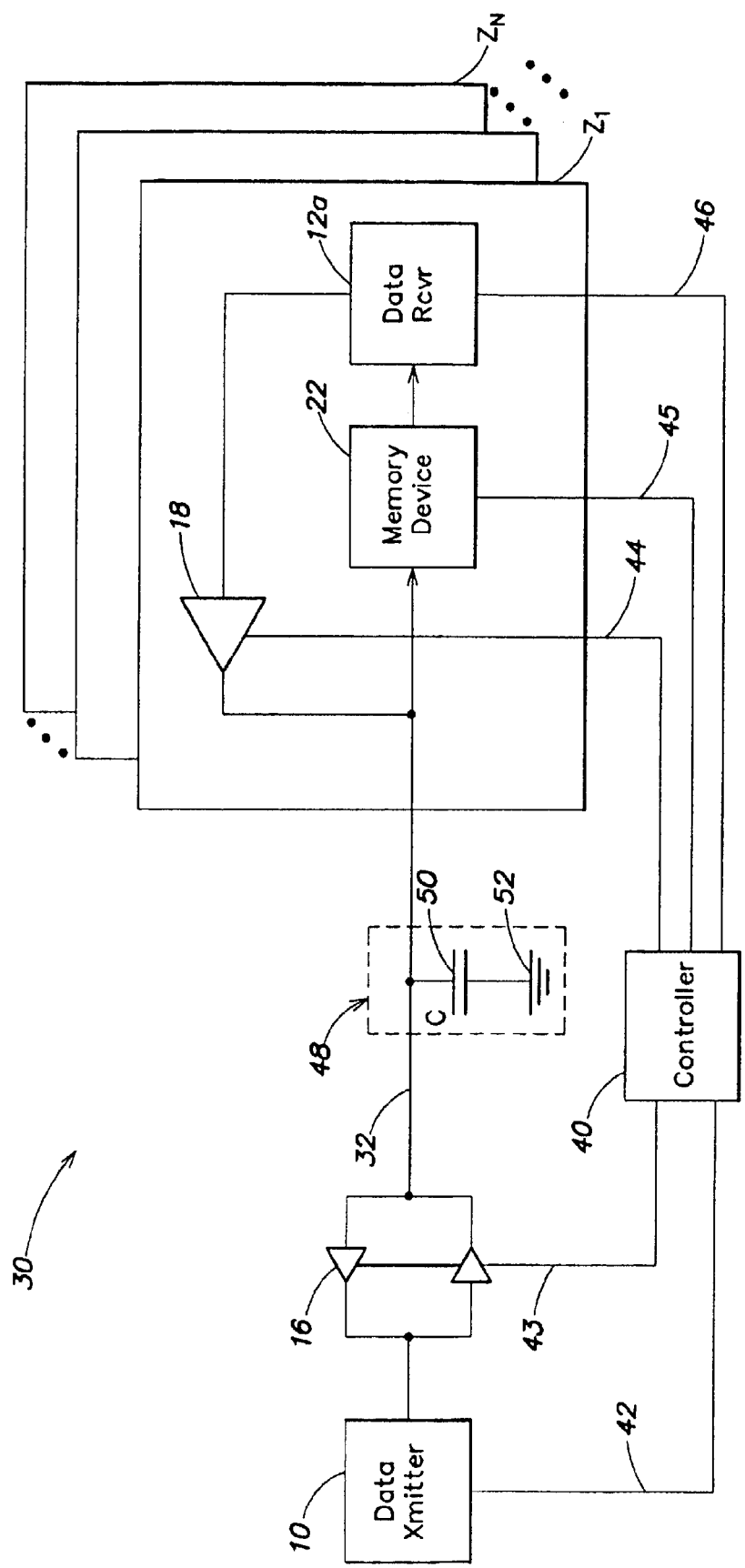
FIG. 3 illustrates a first embodiment of an inventive data transfer device.

FIG. 3 is a schematic illustration of a data transfer device 30 between a first circuit section that includes the data transmitter 10, and at least one second circuit section that includes the data receiver 12a. The data transfer device 30 includes a data bus 32 operably positioned between the data transmitter 10 and the data receiver 12a. On the transmitter side, first data buffer 16 is disposed in the data bus 32. The receiver side includes a plurality N of receiver cells $Z_1 \ldots Z_N$. Each receiver cell $Z_1 \ldots Z_N$ includes an associated data receiver 12, each of these being preceded by second memory device 22 and second data buffer 18. The data buffers 16, 18 can be controlled and implemented in a well-known manner by inverters. The second memory device 22 can also be controlled, and implemented as a conventional flip-flop, latch, etc.

A process controller 40 controls the data transfer between the data transmitter 10 and the data receiver 12a. For this purpose, the process controller 40 is connected by control lines 42–46 to the data transmitter 10, the data receiver 12a, the data buffers 16, 18, and the second memory device 22.

According to an aspect of the present invention, the data transfer device 30 includes a first memory element 48 coupled to the data bus 32. The first memory element 48 is arranged such that it precedes (i.e., it is upstream of) each receiver cell $Z_1 \ldots Z_N$, and thus precedes the second memory device 22. In this embodiment, the first memory element 48 is constructed as a capacitive element C 50, which is connected between the data bus 32 and a reference potential 52.

Figure 4:
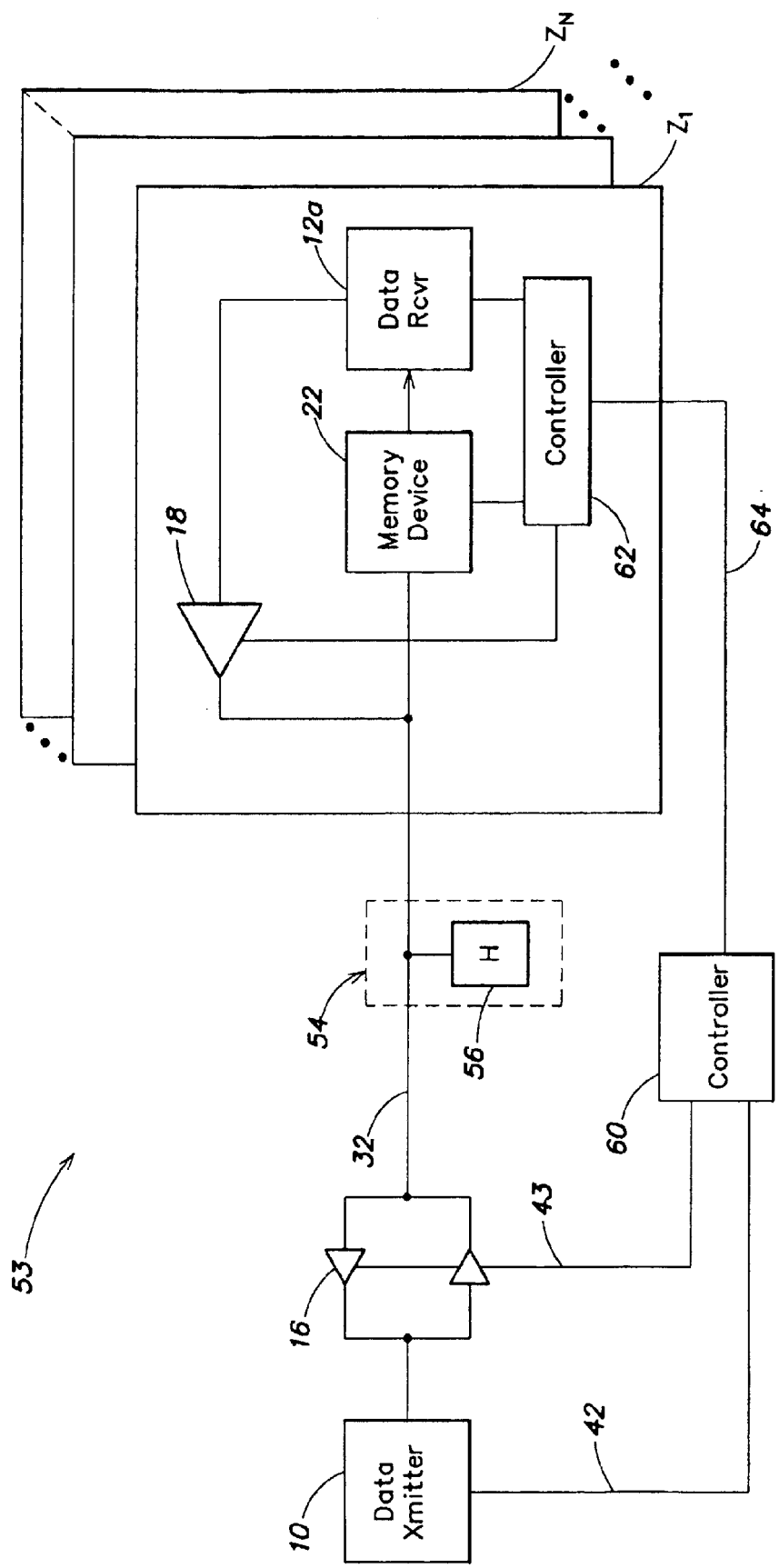
FIG. 4 illustrates a second embodiment of an inventive data transfer device.

FIG. 4 illustrates a second embodiment of an inventive data transfer device 53, that includes a first memory device 54 constructed as a holding element 56 that is connected to the data bus 32. The function of the data transfer devices shown in FIGS. 3 and 4 will now be discussed in more detail.

Referring to FIGS. 3 and 4, the data transmitter 10 transmits data via the data buffer 16 and the data bus 32. The data are held for a certain time on the data bus 32, either dynamically by the first memory element 48 constructed as a capacitive element C 50 (see FIG. 3), or statically by an additional holding element 56 (see FIG. 4). This holding or storing action takes place because a control signal(s) from the controller maintains the first data buffer 16 in a high-ohm state (i.e., a high impedance state). Subsequently, a control signal(s) from the controller opens the second memory device 22 causing the desired valid data that are stored on the data bus 32 to be transferred into the respective second memory device 22. Then the second memory device 22 is again locked. The data bus 32 then can assume arbitrary states (i.e., for example, it can again accept data for the next data transfer).

The capacitive element C 50 in FIG. 3 may be realized by an integrated or a discrete capacitance. In one embodiment the capacitive element C 50 in FIG. 3 is realized by the capacitance of the data bus lines 32 with respect to one or more reference lines. In this case, the function of the inventive data transfer device is assured even if no dedicated capacitive element C is present. It is only necessary to suitably modify the controller 40, especially the activation of the first data buffer 16 to control the transfer of data to the second memory 22.

Referring to FIG. 4, it may be desirable to sub-divide the controller into two circuit sections 60, 62, if this provides additional saving of area and/or an increase of operating speed. In this case, which is shown in FIG. 4, a first circuit section 60 of the process controller is assigned to the data transmitter 10, and a second circuit section 62 of the process controller is assigned to each of the data receivers. An additional control bus 64 is located between the process controls 60, 62 to enable communication between the process controls.

The inventive circuit arrangement is applicable to all possible technologies. The invention is especially advantageous if the circuit arrangement is an integrated circuit. However, a discrete realization may also be used over either short or very long distances. In principle, the inventive data transfer device is applicable to all digital, analog, and mixed-signal devices (i.e., analog/digital circuit arrangements). In addition, the invention is not restricted exclusively to electric circuit arrangements, but can also be expanded to pneumatically operating circuit arrangements. In the case of a transfer device in a pneumatic system, the data buffers, for example, are realized as valves, the memory devices as pressurized containers, and the data buses as conventional lines.

An advantage of the invention is that it provides a saving of area and thus material. In addition, the present invention requires only a slight modification of the process control, and the addition of a memory device for all associated receivers, which can be realized with a capacitive element or a simple holding element.

Although the present invention has been shown and described with respect to several preferred embodiments thereof, various changes, omissions and additions to the form and detail thereof, may be made therein, without departing from the spirit and scope of the invention.

What is claimed is:

1. A circuit arrangement for transferring data between a data transmitter and a plurality of data receivers, said circuit arrangement comprising:
   a buffer device that receives a data signal from the data transmitter and provides a buffered data signal onto a data bus;
   a first memory element configured and arranged as a non-sequential component coupled to said data bus to receives and stores said buffered signal and provides a first stored signal;
   a plurality of second memory elements that receives and stores said first stored signal and each provides an associated second stored signal to its associated one of said plurality of data receivers; and
   a controller that controls the output state of said buffer device, to control the transfer of data from said first memory element to said second memory element.

2. The circuit arrangement of claim 1, wherein said first memory element comprises parasitic capacitance associated with said data bus.

3. The circuit arrangement of claim 1, wherein said first memory device comprises a capacitive element, one of whose terminals is connected to said data bus-, and whose other terminal is connected to a reference potential.

4. The circuit arrangement of claim 3, wherein capacitance of said capacitive element is provided by the line capacitance of said data bus with respect to one or more reference lines.

5. The circuit arrangement of claim 1, wherein said first memory element comprises a dedicated memory element that comprises a holding element.

6. The circuit arrangement of claim 3, wherein said controller controls said data buffers associated with the data transmitter and the data receivers, and the second memory devices.

7. The circuit arrangement of claim 1, wherein said controller comprises:
   a first control section, associated with the data transmitter, for controlling the first data buffer; and
   a second control section, associated with each of the data receivers, that controls second data buffers and said second memory devices, to control data communication between the data transmitter and the data receiver.

8. The circuit arrangement of claim 7, wherein at least one of the circuit sections is part of a peripheral region of the integrated circuit for accepting the connection pads of the input/output connections.

9. The circuit arrangement of claim 1, wherein the circuit arrangement has at least one microprocessor/microcontroller and/or at least one signal processor.

10. The circuit arrangement of claim 1, wherein said first memory element consists of parasitic capacitance associated with said data bus.

11. An integrated circuit arrangement for transferring data between a data transmitter and a plurality of data receivers, said circuit arrangement comprising:

means for receiving a data signal from the data transmitter and for providing a buffered data signal onto a data bus;

a first non-sequential memory element coupled to said data bus to receives and stores said buffered data signal, and provides a first stored signal;

a plurality of second memory elements that each receives and stores said first stored signal, and provides a second stored signal to its associated one of the plurality of data receivers; and a controller that selectively enables the storage of said buffered data signal in said first memory element and the storage of said first stored signal in said plurality of second memory elements.

12. The circuit arrangement of claim 11, wherein said first memory element consists of parasitic capacitance associated with said data bus.

13. The circuit arrangement of claim 11, wherein said first memory element comprises a capacitive element having a first lead and a second lead, wherein said first lead connected to said data bus, and said second lead is connected to a reference potential.

14. The circuit arrangement of claim 11, wherein said first memory element is provided by the line capacitance of said data bus with respect to one or more reference lines.

15. An integrated circuit arrangement for transferring data between a data transmitter and a plurality of data receivers also located on the integrated circuit arrangement, said circuit arrangement comprising:

a receiving circuit for receiving a data signal from the data transmitter and for providing a buffered data signal onto a data bus;

a capacitive element coupled to said data bus to receive and store said buffered data signal, and provide a first stored signal;

a plurality of memory elements that receive and store said first stored signal, and provides a second stored signal to an associated one of said plurality of data receivers; and a controller that selectively enables the transfer of information into said capacitive element and said memory elements.

\* \* \* \* \*

UNITED STATES PATENT AND TRADEMARK OFFICE
CERTIFICATE OF CORRECTION

PATENT NO. : 6,928,506 B2
DATED : August 9, 2005
INVENTOR(S) : Czech et al.

It is certified that error appears in the above-identified patent and that said Letters Patent is hereby corrected as shown below:

Column 4,
Lines 35 and 37, delete "receives" and insert -- receive --.
Lines 35 and 38, delete "stores" and insert -- store --.
Lines 35 and 38, "provides" and insert -- provide --.
Line 49, after "bus" delete "-".

Column 5,
Line 19, delete "receives" and insert -- receive --.
Line 19, delete "stores" and insert -- store --.
Line 20, delete "provides" and insert -- provide --.

Signed and Sealed this

Eleventh Day of October, 2005

JON W. DUDAS
*Director of the United States Patent and Trademark Office*